No. 663,132. Patented Dec. 4, 1900.
F. RITTER.
ARM REST.
(Application filed July 12, 1900.)
(No Model.) 2 Sheets—Sheet 1.
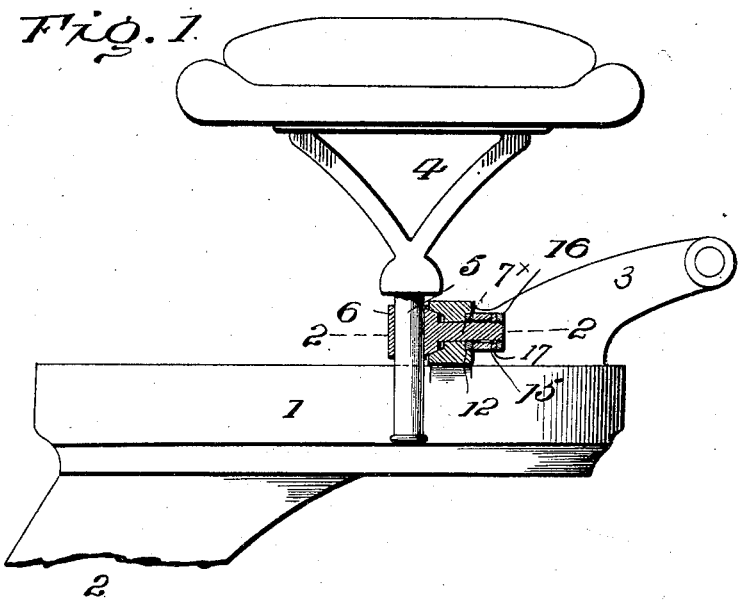
Fig. 1.
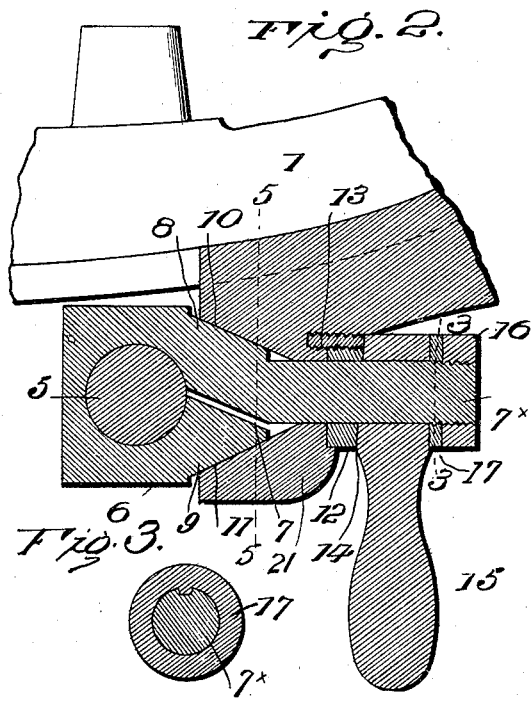
Fig. 2.
Fig. 3.
Witnesses
Inventor
Frank Ritter
by
Attorney No. 663,132. Patented Dec. 4, 1900.
F. RITTER.
ARM REST.
(Application filed July 12, 1900.)
(No Model.) 2 Sheets—Sheet 2.
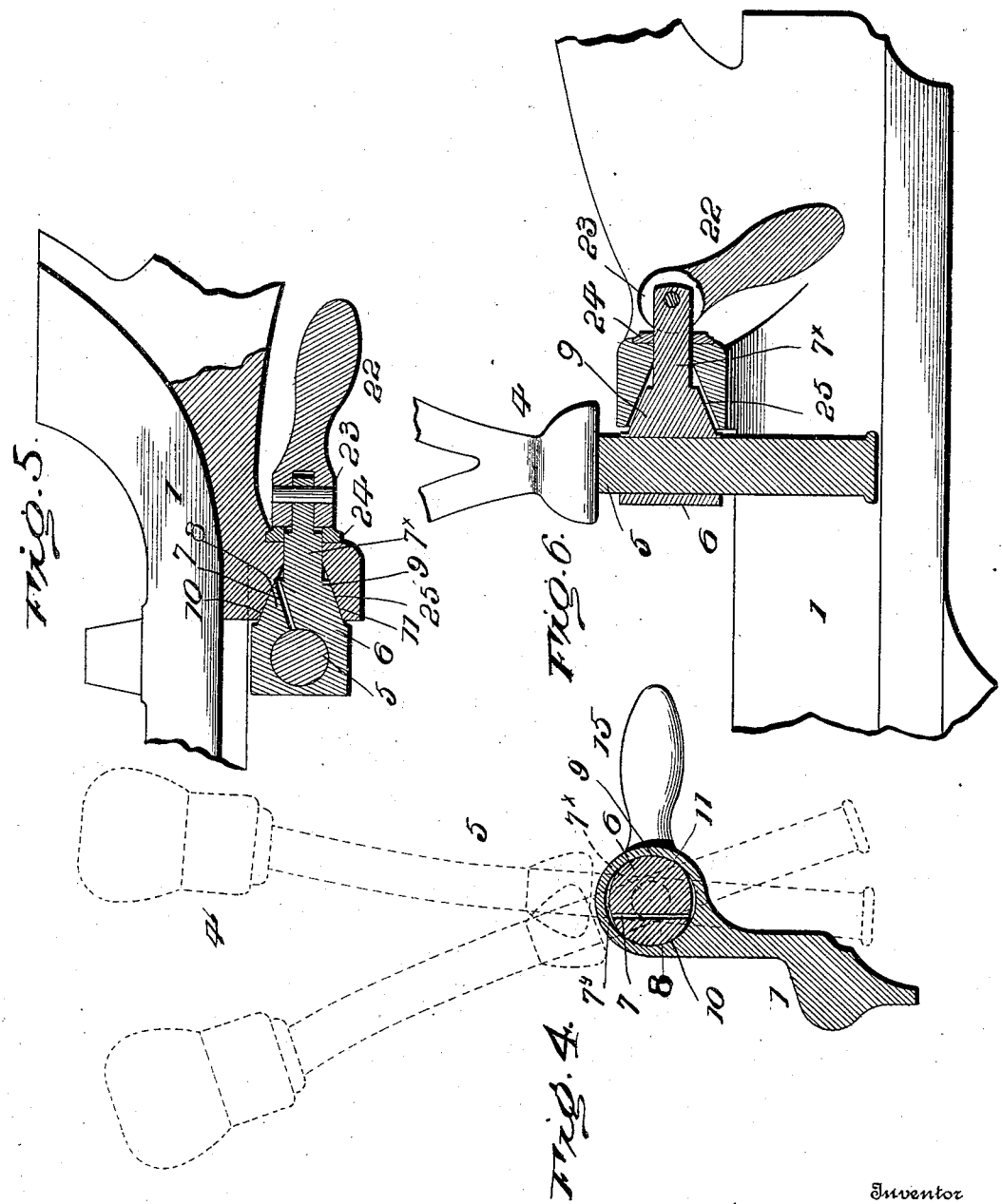

UNITED STATES PATENT OFFICE.

FRANK RITTER, OF ROCHESTER, NEW YORK.

ARM-REST.

SPECIFICATION forming part of Letters Patent No. 663,132, dated December 4, 1900.

Application filed July 12, 1900. Serial No. 23,334. (No model.)

*To all whom it may concern:*

Be it known that I, FRANK RITTER, a resident of Rochester, in the county of Monroe and State of New York, have invented certain new and useful Improvements in Arm-Rests; and I do hereby declare the following to be a full, clear, and exact description of the invention, such as will enable others skilled in the art to which it pertains to make and use the same.

The invention relates to adjustable arm-rests suitable for use with dental chairs, and has for its object to provide simple, efficient, and conveniently-operated locking mechanism for arm-rests adjustable in a plurality of planes.

The invention consists in the construction herein described and pointed out.

In the accompanying drawings, Figure 1 is a partial elevation of a chair-seat with an arm-rest and locking devices, the latter being shown in section. Fig. 2 is a section on line 2 2 of Fig. 1. Fig. 3 is a section on line 3 3 of Fig. 2. Fig. 4 is a section on line 5 5 of Fig. 2. Fig. 5 is a section of a modification. Fig. 6 is a section taken lengthwise through the arm-rest stem shown in Fig. 5.

Numeral 1 indicates a chair-seat frame, and 2 a portion of the platform and foot-rest frame.

3 denotes one of the seat-frame arms which receive the trunnions of a back-frame, (not shown,) all these parts being of any usual or desired construction.

4 indicates an arm-rest, having a stem 5 lengthwise and rotatably adjustable in a clamp 6. Said clamp is split at 7, and the split parts are clamped upon the stem 5 by various devices, the preferred construction being shown in Figs. 1, 2, and 3.

$7^x$ denotes a clamp-stem fixed to a part 8 of the split clamp and extending through a part of the seat-frame which has a seat or socket with inclined faces 10 and 11, adapted to receive similar faces of the wedge-like parts 8 and 9 of the rod-clamp. These parts will be cut away slightly, as indicated at 7 in Fig. 4, to permit limited movement to and from each other in their socket in the operation of clamping or unclamping.

12 denotes a ring fixed to the seat-frame, as by a screw 13. It is loose on stem $7^x$ and has a cam-face 14.

15 is a handle rotatable on said stem and provided, preferably, with a cam-face similar but oppositely situated to that of the ring 12.

16 denotes a nut to hold the handle on the clamp-stem $7^x$, and 17 is a washer keyed to the stem $7^x$ to prevent the nut being turned by the handle. By suitably manipulating the handle the cam face or faces can be made to draw the clamp-stem $7^x$ into the socket, with the effect to compress the clamp upon the arm-rest stem 5, and also lock the clamp and rest to the seat-frame and prevent the lateral movement of the arm-rest. A washer 17 is placed on the stem between the handle and the socket-containing part 21 of the seat-frame.

As shown in Figs. 5 and 6, the handle 22 is provided with a cam or eccentrically-pivoted head 23, adapted to bear on the frame or on a washer 24, situated between it and the frame. The handle can be turned on its pivot with the effect to draw the clamp 6 into a socket 25 in the frame, and thereby clamp the arm-rest stem.

The arrangement of the handle shown in Figs. 1 to 3 is preferred for the reason that it does not rotate with the clamp and with its stem 5 when the arm-rest is moved.

Whenever in either form of the construction illustrated the handle is manipulated to relieve the split clamp the latter expands and relieves the arm-rest stem. The arm-rest can then be raised or lowered and also turned in the clamp 6, and the arm-rest and its stem, together with the clamp and clamp-stem, can be rotated in the bearing of said clamp-stem in the frame. After the desired adjustments have been made the arm-rest can be locked in position by using the handle to draw the split clamping-block into its seat. The arm-rest can thus be adjusted to suit occupants of various sizes and can be securely clamped under any adjustment by the use of the clamp and handle.

It has heretofore been proposed to provide arm-rests with means for a vertical and a lateral adjustment and also for a swinging movement in a vertical plane, and it also has been proposed in a distinct structure to make an arm-rest rotatably adjustable in a horizontal plane by means of a stem held in a split clamp having a socket in a plate connected to the seat-frame, said plate being forced upon the clamp to tighten it upon the stem.

By my improvement the arm-rest can be swung both in horizontal and vertical planes and can also be adjustable vertically in a right line. Further, the split conical clamp has one of its split parts prolonged to receive a clamping-handle. The seat for the cone comprising the said split parts of the clamp is formed in the seat-frame itself, and the construction is such that the handle in clamping draws the clamp-cone into a socket in the seat-frame itself, making an efficient and economical construction and avoiding unsightly slots, projections, and disposition of parts. One part of the cone of the clamp is made greater in cross-section than a semicircle to provide for an extension of suitable size to receive the handle. Said cone part may be made sufficiently large to partially fit the conical seat before the clamp is closed and may be cut away, as at 7$^y$, to provide for a lateral movement of said large cone part to meet a corresponding movement of the smaller part.

Having thus described my invention, what I claim as new, and desire to secure by Letters Patent, is—

1. A seat-frame, an arm-rest having a stem, and a split clamp embracing the stem, said stem being adjustable lengthwise in the clamp, and the clamp rotatably connected to the seat-frame.

2. A seat-frame having an approximately conical socket, an arm-rest having a stem, and a split clamp embracing the stem, the split parts of the clamp having an approximately conical form and rotatably connected to the seat-frame in the socket.

3. A seat-frame, an arm-rest having a stem, a clamp embracing the stem, said stem being adjustable lengthwise of the clamp, and the clamp rotatably connected to the seat-frame, and a handle to operate the clamp under every adjustment, said clamp having a split wedge-formed part, and a coacting socket, the handle being adapted to draw the clamp into said socket to close said clamp.

4. A seat-frame, an arm-rest having a stem, a clasp embracing the stem, said stem being adjustable lengthwise of the clamp, and the clamp rotatably connected to the seat-frame, and a handle to operate the clamp under every adjustment, said clamp having a split wedge-formed part, and a coacting socket, the handle being adapted to draw the clamp into said socket to close said clamp, and said part and socket having an approximately conical form and the wedge-formed part slightly cut away to provide for its lateral movement in the socket.

5. A seat-frame, an arm-rest having a stem, a clamp embracing the stem, said stem being adjustable lengthwise of the clamp, and the clamp rotatably connected to the seat-frame, and a handle to operate the clamp under every adjustment, said clamp having an unequally-split wedge-formed part, and a coacting socket, the handle being adapted to draw the clamp into said socket to close said clamp, and said part and socket having an approximately conical form and the larger wedge-formed part slightly cut away to provide for its lateral movement in the socket.

6. A seat-frame, an arm-rest having a stem, a clamp embracing the stem, said stem being adjustable lengthwise in the clamp, and the clamp rotatably connected to the seat-frame, a handle to operate the clamp under every adjustment, said handle being rotatably connected to the clamp, and a fixed washer on the clamp-stem contiguous the handle.

7. A seat-frame having a socket, an arm-rest having a stem, a clamp embracing said stem and provided with a wedge-shaped part having an extension, a handle operatively connected to the stem to draw the clamp-wedge into the socket in the seat-frame.

8. A seat-frame having a socket, an arm-rest having a stem, a clamp embracing said stem and provided with a wedge-shaped part having an extension, a handle operatively connected to the stem to draw the clamp-wedge into the socket in the seat-frame, said wedge part being split and the handle connected with one of the parts.

In testimony whereof I have signed this specification in the presence of two subscribing witnesses.

FRANK RITTER.

Witnesses:
G. WILLARD RICH,
CHARLES W. FERTIG.